United States Patent [19]

Linkner, Jr.

[11] 4,397,505

[45] Aug. 9, 1983

[54] CONTROL VALVE

[75] Inventor: Herbert L. Linkner, Jr., Dexter, Mich.

[73] Assignee: Kelsey-Hayes Company, Romulus, Mich.

[21] Appl. No.: 244,517

[22] Filed: Mar. 16, 1981

[51] Int. Cl.³ .............................................. B60T 13/38
[52] U.S. Cl. ..................................... 303/9; 137/102; 137/112; 303/6 M
[58] Field of Search .............. 137/102, 112, 843, 846, 137/854; 251/324, 334; 303/6 M, 7, 9, 84 R

[56] References Cited

U.S. PATENT DOCUMENTS

| | | | |
|---|---|---|---|
| 2,627,388 | 2/1953 | Johnson et al. | 137/112 X |
| 2,913,000 | 11/1959 | Roberts | 137/854 |
| 3,340,899 | 9/1967 | Welty et al. | 137/843 X |
| 3,972,343 | 8/1976 | Burge | 137/112 |
| 4,017,125 | 4/1977 | Durling | 303/9 X |
| 4,182,535 | 1/1980 | Fannin | 303/9 |

*Primary Examiner*—Duane A. Reger
*Attorney, Agent, or Firm*—Ralph J. Skinkiss; William P. Hickey

[57] ABSTRACT

Pneumatic valve construction comprising a valve chamber having opposing inlet ports with opposing axially located valve seats, and a ball therebetween constructed and arranged to move off of one valve seat into engagement with the other valve seat upon an unbalance in pressure. The construction includes a bottom outlet port that extends to the top of another larger cylindrical chamber having an elastomeric piston therein with fluid flow clearance between the piston and the side walls of the chamber. A tubular exhaust port extends axially inwardly from the bottom side of the chamber to abut the bottom side of the rubber piston. An annular fluid flow chamber exists between the tubular exhaust seat and the side walls of the cylindrical chamber to allow flow past the piston through the space to a delivery port. The rubber piston includes a conically shaped lip which extends out into engagement with the side walls of the cylindrical chamber to help center the piston in the cylinder and to prevent reverse flow from the outlet port back to the inlet ports.

11 Claims, 4 Drawing Figures

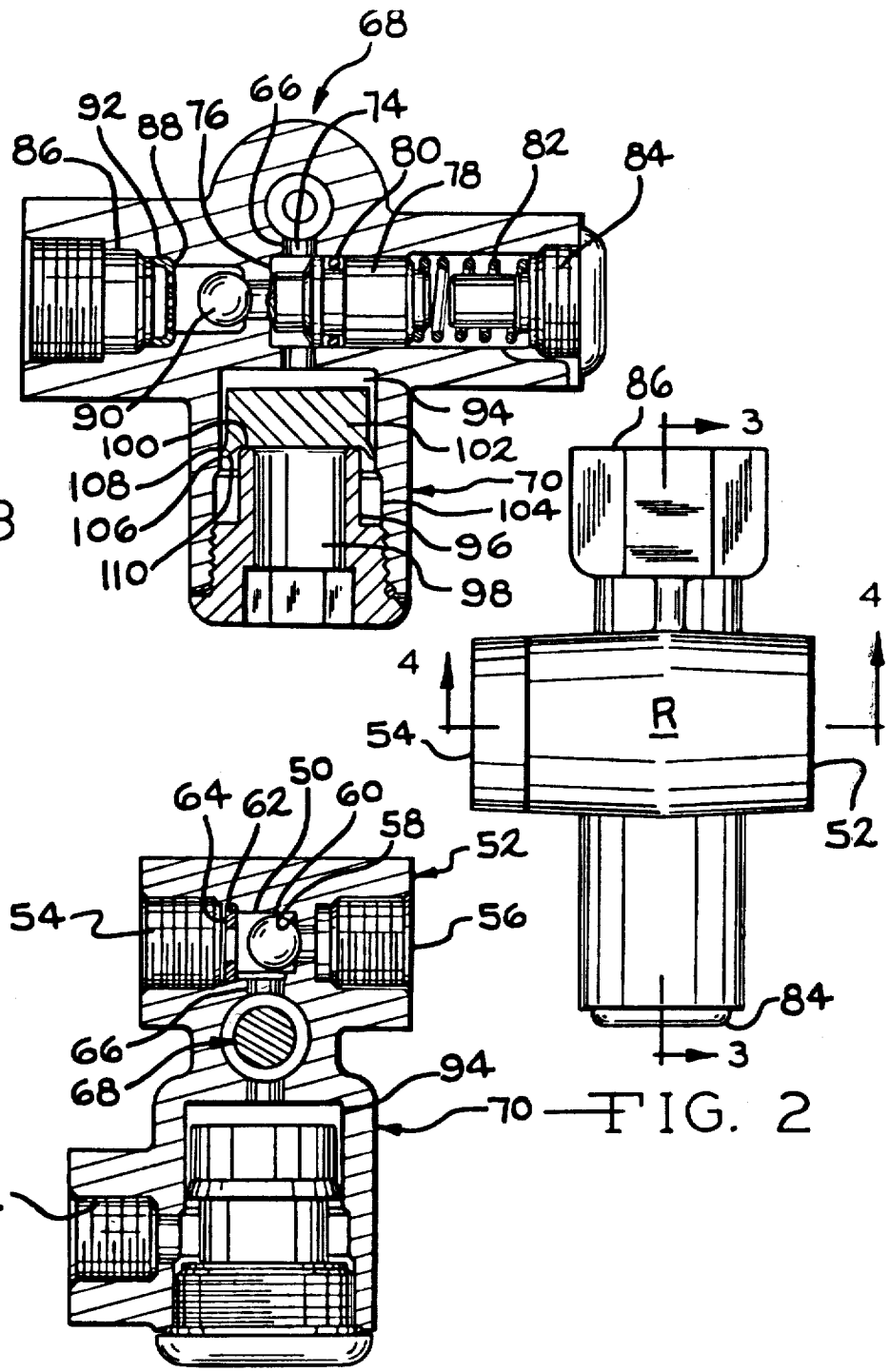

CONTROL VALVE

BACKGROUND OF THE INVENTION

The air actuating systems for tractor-trailer combination vehicles of the day comprise a number of individual valves that perform various functions in controlling the flow of pressure from an air compressor on the tractor to brake actuating pressure chambers at the various wheels of the combination vehicle. It will be understood that a great number of types of hazards can occur in combination vehicles of this type, and that various portions of the valving in such systems will protect against one or more of such hazards. One hazard which exists is caused upon the separation of the tractor and trailer of the combination vehicle; which, of course, will vent both the control and supply pressure lines coming from the tractor so that the brakes on both portions of the vehicle would be disabled if suitable valving were not supplied. Other functions which are performed by the valving of such systems will protect against a loss in pressure of one of the control or supply lines.

Many brake actuating cylinders include springs which mechanically apply the brakes and an opposing diaphragm against which service pressure is supplied to remove the spring applying force. These brakes will also have a second diaphragm against which control pressure is supplied for normal actuation of the brakes. It is possible that failures of some components will cause both the springs and the control diaphragm to apply their forces simultaneously to produce a force that might overload the mechanical brake components. There is considerable need in such systems for valve construction having improved reliability and service life.

Another object of the invention is the provision of new and improved valving having two inlet ports and arranged to pass on pressure from whichever inlet port is supplying the greatest pressure, while closing off the other of the inlet ports.

Apart from the general need for improved valve construction for passing pressure from either of two inlet ports to an outlet port, it is an object to provide an improved valve construction for passing an initial supply pressure to the spring brake releasing chamber, for thereby allowing the supply pressure to fall to a predetermined value before causing the spring brakes to be applied, and for causing the spring brakes to be applied only when the supply pressure falls below such predetermined value.

A still further object of the present invention is the provision of new and improved valving which will perform both of the above-mentioned functions.

Further objects and advantages of the invention will become apparent to those skilled in the art to which the invention relates from the following description of the preferred embodiments described with reference to the accompanying drawings.

BRIEF DESCRIPTION OF THE DRAWINGS

FIG. 2 is a plan view of valving embodying the present invention.

FIG. 3 is a vertical sectional view taken on the line 3—3 of FIG. 2.

FIG. 4 is a sectional view taken approximately on the line 4—4 of FIG. 2.

DESCRIPTION OF THE PREFERRED EMBODIMENTS

Figure 1:
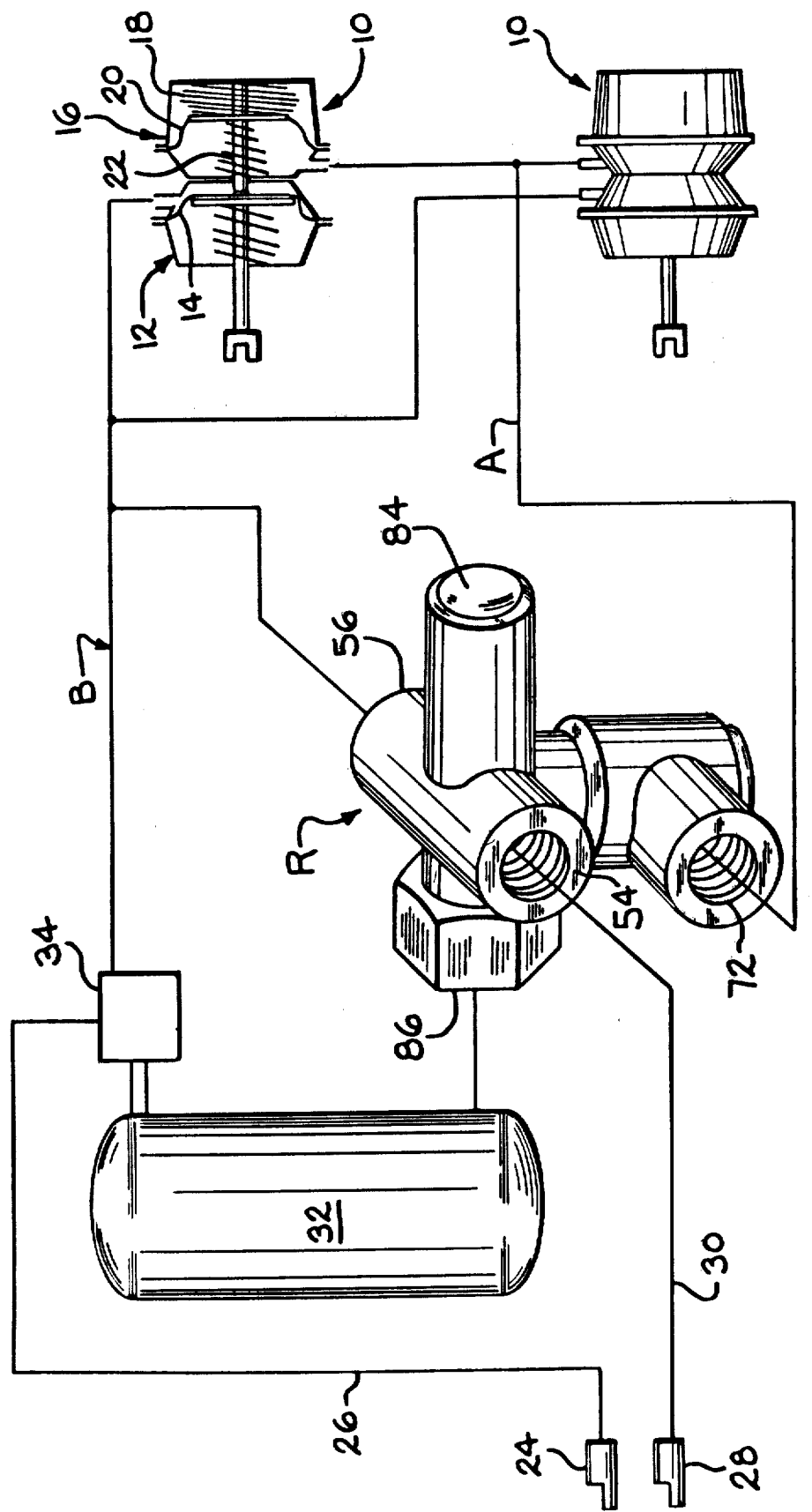
FIG. 1 is a schematic drawing of a braking system for a trailing vehicle and which includes the valving of the present invention.

Except for the valving later to be described, the air actuating system shown in FIG. 1 is generally typical of the systems used on the semitrailers of today.

The brake actuating motors 10 that are used on most trailer vehicles comprise a service brake portion 12 having a diaphragm 14 therein onto which control pressure is supplied for normal actuation of the brakes. The brake actuating motors 10 also have a spring brake portion 16 having a brake applying spring 18 that is opposed by a diaphragm 20 when service air pressure is put upon the diaphragm. The spring 18 acts through a diaphragm rod 22 which in turn pushes upon the brake applying rod of diaphragm 14 upon service air failure to set the brakes. One such brake actuating motor 10 is usually provided for each wheel of the trailer.

Control pressure is conducted from the back of the tractor through the glad hand, or quick disconnect 24 and control conduit 26. Likewise, supply pressure is conducted from the back of the tractor through the glad hand 28 and supply conduit 30. A reservoir 32 is mounted on the trailer, and suitable trailer valving R is provided for supplying pressure from the supply conduit 30 to the reservoir 32, as well as to all diaphragms 20 for deactuating the spring brakes of the trailer. A relay valve 34 may be provided to regulate pressure from the control conduit 26 to the service brake chambers 12 for service braking. In addition, the control or delivery pressure from the relay valve 34 is communicated to the trailer valve R, so that the valve R can use it to supply pressure to the spring deactivating diaphragm 20 under certain conditions, as will later be explained. The trailer relay valve R performs still other functions which will be further explained following a description of its construction.

The valve R comprises a horizontal counterbore 50 that is formed in one end of a valve body 52. The counterbore extends between a supply inlet port 54 and a control port 56 or vice versa, and forms a shoulder 58 which acts as a valve seat for a ball valve 60. When the ball 60 is in engagement with the shoulder 58, it closes off the inlet port 56. The counterbore 50 is also provided with another shoulder 62 against which an annular partition member 64 is expanded to form a valve seat for closing off the port 54 when abutted by the ball 60. A bottom outlet port 66 communicates pressure from the counterbore 50 past a reservoir charging valve 68 to a second valving 70, at the bottom of the valve body 52, for passing the pressure onto a delivery port 72 that communicates with the spring brake deactivating diaphragm 20.

Normally the pressure in the relay valve delivery line B will be less than that in the supply line 30 and the ball 60 will be against the shoulder 58 as shown in the drawings. If the pressure in the supply lines 30 falls below the pressure in the control port 56, the ball 60 will move from the shoulder 58 to a position against the annular partition member 64 to close off the service inlet port 54. Thereafter, pressure from the control pressure inlet port 56 is passed on to the spring brake portions of the trailer's brakes. It has been found that in order to assure proper operation of the valve, the valve seats 58 and 64 must be spaced so that the check ball 60 travels a distance no more than approximately one half of the diameter of the valve seats.

The reservoir charging valve 68 is formed by another counterbore 74 that extends through the valve body 52 and which intersects the side outlet port 66. Counterbore 74 provides a shoulder 76 adjacent one side of the port 66 to form a valve seat for a piston 78 having a reduced diameter end for allowing pressure to flow there past to the second valving 70 while it is in abutment with the valve seat 76. The piston 78 has a suitable seal 80 on outlet port 66 opposite shoulder 76. A biasing spring 82 urges the piston against the shoulder 76 at pressures below a predetermined pressure, which in the present instance, is approximately 55 psi. The biasing spring 82 is held in place by a suitable threaded plug 84 having provisions therein for permitting atmospheric communication with the back side of the piston 78. The opposite end of the counterbore 74 extends from the shoulder 76 to a reservoir charging port 86, and it is counterbored to provide a shoulder 88. A foraminous disc 92 is pressed into the reservoir charging port 86 against the shoulder 88 to loosely retain the check valve ball 90; so that the ball will prevent flow out of the reservoir 42 when the pressure in the side outlet port 66 drops, and the piston 78 is off of its valve seat 76. The reservoir charging port 86 is suitably connected to the trailer reservoir 42.

As previously indicated, the side outlet port 66 extends past the reservoir charging valve 68 to the second valving 70 located in the bottom of the valve body 52. The second valving 70 is formed by a large cylindrical chamber 94 which in effect is a large counterbore for the side outlet port 66. The lower end of the chamber 94 is closed off by an annular threaded plug 96 having a central opening 98 therethrough which forms an exhaust port for the valving 70. The upper end of the annular threaded plug 96 is suitably rounded to form an annular valve seat 100, and a large piston 102 is positioned in the large cylindrical chamber 94 to act as a valve closure member for the valve seat 100. The annular space 104 between the annular seat 100, and the sidewalls of the chamber 94 forms a delivery passage communicating with the delivery port 72 previously described.

The main body portion of the large rubber piston 102 has sufficient clearance with respect to the side walls of the chamber 94 that fluid flow can proceed from the side outlet port 66 past the rubber disc to the delivery port 72 is generally unimpeded manner, while the piston 102 is seated against the annular valve seat 100. The large rubber piston 102 carries an annular lip 106 around the bottom corner thereof which bridges the annular space between the piston 102 and the sidewalls of the chamber 94 to form a one way seal preventing a reverse flow from the delivery port 72 to the side outlet port 66. Preferably, the lip 106 has an upper conical surface 108 and a lower conical surface 110 which approach each other to form a rounded sealing portion that contacts the side walls of the chamber 94. The lower conical surface 110 extends inwardly along the bottom of the piston 102 to a position generally opposite the annular valve seat 100. This construction allows the lip to be flexible enough to permit downward flow therepast while being strong enough to prevent reverse upward flow. The spring force of the flexible lip against the sidewalls of chamber 94 help center piston 102 in the chamber 94. While not necessary in all instances, the lower conical surface 110 is arranged so that it will center on the annular valve seat 100 as the piston 102 moves downwardly against the valve seat.

When there is downward flow past lip 106, the lip is moved a small distance away from contact with the sidewalls of chamber 94. Piston 102 moves downward until stopped by the seat of 96 with the lip 106 not contacting or rubbing on the sidewalls of chamber 94. This results in a very low wear on the lip 106 and sidewalls of the chamber 94 as shown by tests of over one million pressure reversing cycles with no visible wear.

Any tendency of the piston 102 and/or the lip 106 to get off center of the chamber bore 94, causes increased air flow on the side with the largest clearance between lip 106 and the sidewall. This increased flow on this side causes reduced venturi pressure forces on that side which tend to draw the piston 106 back on center. This causes the piston to be stable in downward travel.

In the embodiment shown, the annular valve seat 100 is so proportioned relative to the piston 102 that it takes a pressure in the delivery port 72 that is less than twice that in the side outlet port 66 to move the piston 102 off of the annular valve seat 100.

With this arrangement, pressure from either the supply inlet port 54 or the control inlet port 56, whichever is greater, goes practically undiminished to the delivery port 72 upon the initial energization of the system. Thereafter, however, the pressure in both of the inlet ports 54 and 56 may fall until the highest pressure in either inlet port is only one half of its initial charging pressure before the piston 102 will be lifted off of the annular valve seat 100, and the pressure in the spring brake chambers 16 is reduced. It will further be seen that this reduction of pressure in the spring brake chambers 16 will be a modulated one, and will only continue as the highest pressure in the inlet ports 54 and 56 further decreases below half of their initial pressure. For example, if the initial pressure was 100 psi, the spring brakes 16 on the trailer will be held completely released until the pressure in both inlet ports 54 and 56 falls below 50 psi, and following which pressure in the spring brake chambers 16 would be maintained at a value twice that of the pressure in whichever inlet port 54 and 56 is the greatest.

It will now be seen that the first valving formed by the counterbore 60 will have various uses other than that above described; and that the second valving 70 will have various uses other than that above described. The two valves, when put together, provide a combination that will perform improved functioning of a tractor-trailer braking system, and this is accomplished in a simple, and yet most efficient and reliable manner.

The reservoir charging valve portion 68 above described, makes it possible for the valving to supply pressure to the trailer spring brake line A under conditions wherein the trailer reservoir 32 is ruptured. This will make it possible for the trailer to be moved under conditions when the trailer brakes of prior art systems would be locked up.

While the invention has been described in considerable detail, I do not wish to be limited to the particular embodiments shown and described; and it is my intention to cover hereby all novel adaptations, modifications, and arrangements thereof which come within the practice of those skilled in the art to which the invention relates.

I claim:

1. A backpressure valve for maintaining a pressure on an outlet port equal to or greater than that at an inlet port comprising: a valve body having an axially extending cylindrical chamber therein, an axially extending exhaust tube projecting into one end of said cylindrical chamber and providing an annular outlet pressure chamber surrounding said exhaust tube, an annular exhaust valve seat on the end of said exhaust tube, a valve piston in said cylindrical chamber having a valve closure surface adapted to abut said annular valve seat, said valve piston having an annular clearance with respect to the sidewalls of said cylindrical chamber permitting fluid flow therethrough in a forward direction, and a one way seal projecting out of the side of said valve piston into engagement with said cylindrical sidewalls, said one way seal permitting said forward flow from said cylindrical chamber to said annular outlet pressure chamber but preventing reverse flow.

2. The valve of claim 1 wherein said one way seal is a bendable projection which is reduced in diameter by said forward flow and is expanded into tight engagement with said sidewalls by said reverse flow.

3. The valve of claim 2 wherein said projection extends angularly outwardly beneath said valve closure surface.

4. The valve of claim 2 wherein said valve piston has a portion of a tapered surface projecting angularly outwardly beneath said valve closure surface for engagement with said exhaust tube to aid in alignment therewith.

5. A valve piston comprising: a resilient generally cylindrical piston having top and bottom ends with an annular valve seating surface on the bottom end, an annular projection extending angularly outwardly of said piston surrounding its annular valve seating surface, said annular projection having a smooth annular lip forming a sealing surface, and said annular projection being sufficiently yieldable that it can be flexed radially inwardly without buckling to accommodate an interference fit with a cylindrical surface of slightly smaller diameter than said annular lip and to provide a fluid tight seal against flow past the piston in an upward direction while permitting additional radially inward flexture to open up the seal for flow past the piston in a downward direction.

6. The valve piston of claim 5 wherein the bottom end of said piston has a smooth annular surface inwardly of said projection for sealing engagement with an annular valve seal.

7. The valve piston of claim 6 wherein the radially inner surface of said projection is conically shaped to act as a guide surface for centering said piston over a valve seat.

8. The backpressure valve of claim 1, further comprising a control pressure inlet port and a supply pressure inlet port communicating with said cylindrical chamber above said valve piston, and valve means communicating whichever inlet port has the greatest pressure to said valve piston while closing off the other inlet port.

9. The backpressure valve of claim 8, further comprising a supply pressure storage port also communicating with said cylindrical chamber above said valve piston, valve means closing off said supply pressure storage port whenever the pressure above said valve piston drops below a predetermined value, and a check valve preventing flow in through said supply pressure storage port to said cylindrical chamber.

10. A backpressure valve for vehicular air braking systems and the like comprising a valve body having a first cylindrical chamber opening outwardly thereof, an annular plug in the outer end of said chamber, said annular plug having an axially extending inner tubular projection spaced from the sidewalls of said cylindrical chamber to form an annular outlet chamber, said tubular projection having an annular exhaust valve seat on its inner end, a valve piston in said cylindrical chamber inwardly of said annular valve seat and having a main body portion with fluid flow clearance between itself and the sidewalls of said chamber, an annular flexible skirt depending angularly outwardly from said main body portion into engagement with the sidewalls of said cylindrical chamber to form a one way seal therewith against flow from said outlet chamber past said valve piston, a second chamber extending through said valve body with a control port at one end and a supply port at the other end, valve means in said second chamber functioning to close off whichever port has the lowest pressure, and means communicating whichever port is open to the side of said piston opposite from said exhaust valves seat, thereby allowing the highest pressure of said supply or control port to be directly communicated to said outlet chamber, and means for moving said piston off of the exhaust valve seat when the pressure in said supply or control port decreases to a predetermined fraction of the pressure in said outlet chamber, thereby allowing flow exhaust to the atmosphere through said tubular projection and through said annular plug.

11. The backpressure valve of claim 10 including a tank charging port communicating with whichever control or supply port has the greatest pressure, a check valve preventing return flow into the valve through said tank charging port, and valve means closing off said tank charging port whenever the highest pressure of said supply port or control port drops below a predetermined pressure.

* * * * *